June 13, 1933.    H. N. MARSH ET AL    1,913,845
APPARATUS FOR DETERMINING DEEP WELL TEMPERATURES
Filed March 14, 1930

JOHN H. HOWARD
HALLAN N. MARSH
*INVENTORS*

*ATTORNEY*

Patented June 13, 1933

1,913,845

UNITED STATES PATENT OFFICE

HALLAN N. MARSH AND JOHN H. HOWARD, OF HUNTINGTON PARK, CALIFORNIA

APPARATUS FOR DETERMINING DEEP WELL TEMPERATURES

Application filed March 14, 1930. Serial No. 435,902.

At this present time the drilling of deep wells for petroleum has reached a depth close to ten thousand feet, and drilling of wells of from seven to nine thousand feet is common practice.

Accurate observation of the temperature existing at the bottom of such wells, or even those of much less depth, is desirable for scientific research, but there is also a definite commercial demand for an instrument which will quickly, accurately and cheaply effect a temperature observation for use in predicting the possibility of making a satisfactory water shut-off with cement. Practical measurements of this character should be made, in the deeper fields, in practically every well drilled, and the only suitable instrument is one which can be handled by unscientific oil-well operators without any material interference with drilling or other operation which may be under way at the time.

Heretofore recourse has been had to two types of instruments; electrical and mercury thermometers. The first named is accurate and dependable but it has proven very difficult to construct a conductor the insulation of which will withstand the destructive effects of water, oil and abrasion, and it is inconvenient to use. Its use appears to have been abandoned even for purposes of scientific observation. The mercury thermometer of the maximum registering type is simple and cheap, but a correct reading at the well head depends on maintaining the position of the separated part of the mercury column or of the steel needle by which the maximum reading is recorded. This is difficult even in the hands of trained observers and it is believed that the instrument is so unreliable as to be useless in the hands of well workers because of the excessive jolting and jarring to which it is apt to be subjected while being withdrawn from the well.

In the instrument which we propose all these objections are entirely avoided and, with the one simple precaution of allowing the instrument to remain in the position at which the temperature is to be read for a sufficient time to enable it to attain the temperature of the surrounding medium, readings of any desired degree of accuracy and of complete dependability may be made by the well operatives, or the instrument containing the fixed indication may be labelled and sent to the office for reading.

The nature and construction of our improved apparatus may best be described in connection with the attached drawing and the following description thereof, in which.

Figures 1, 2:
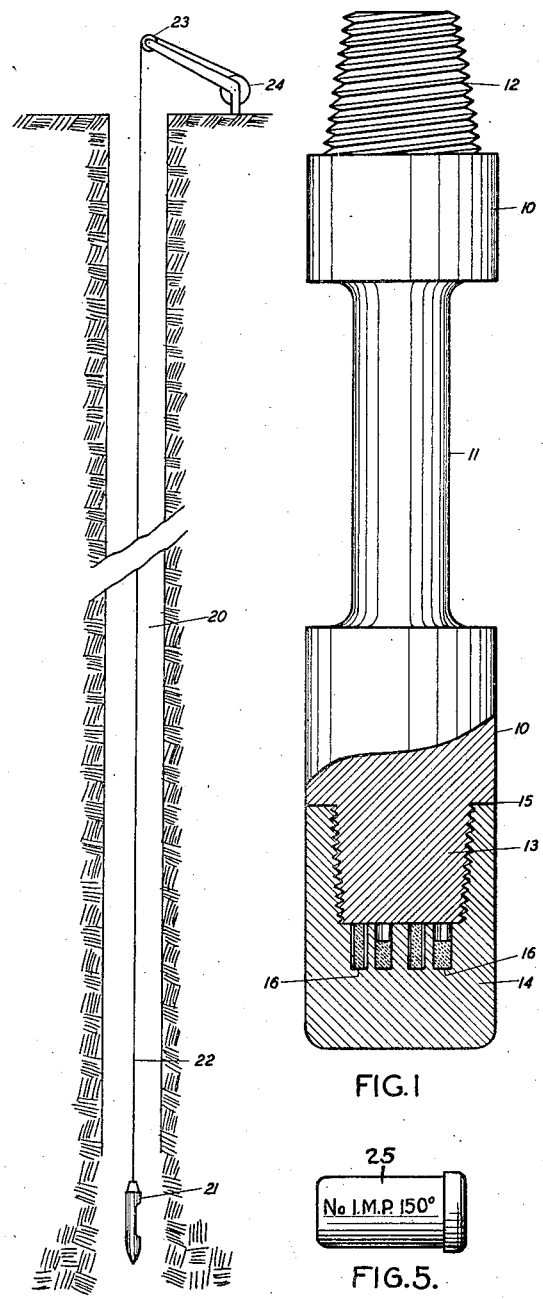
Fig. 1 shows partly in elevation and partly in vertical section, one modification of a complete instrument suited to general use.
Fig. 2 shows in the same manner, another modification designed for use in cases where the hole is crooked or obstructed.

Referring to Fig. 1, 10 is a steel or other metal bar, which may be cylindrical in shape or may have a shank of reduced diameter as indicated at 11, this solely to reduce its weight and heat capacity. At the upper end may be formed the pin 12 threaded to fit a standard box of a size suited to be run on wire line or drill pipe, or this pin may be formed to fit a special cap or other means of attachment to the end of a light wire line. At the lower end a threaded pin 13 is formed to fit a corresponding thread in a heavy cap 14, it being desirable to make a liquid tight joint at the point 15 to exclude liquid from the interior of the cap.

In the bottom of the interior of the cap we drill a plurality of small holes 16, for instance ⅛" in diameter and say ½" deep, which holes must not penetrate the thickness of the cap 14. Within these holes are placed small sticks or fragments of alloys or other substances having accurately determined melting points, as will later be described.

Referring to Fig. 2, the bar 10 and the upper pin 12 are as previously described, but the lower end of the bar may be shaped to a point as indicated at 17, a side of the bar is cut away as shown at 18, the holes 16 are drilled transversely into the remaining metal of the bar, and each individual hole 16 is closed with a screw plug 19.

Figure 3:
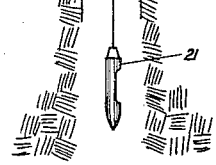
Fig. 3 illustrates diagrammatically the instrument shown in Fig. 2 in place in the hole in which the temperature observation is to be made.
Figure 5:
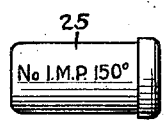
Fig. 5 illustrates one of the cartridges marked with the number and the melting point of the fragment.
Figure 4:
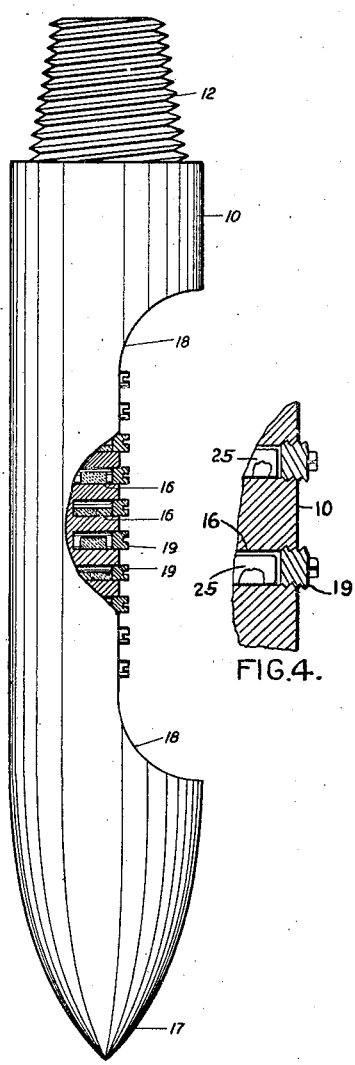
Fig. 4 illustrates on a larger scale a portion of the body 10 of Fig. 2 provided with cartridges 25 for containing the fragments of solids.

Referring to Fig. 3, 20 indicates a well or bore hole, 21 an instrument of the type shown in Fig. 2 suspended by a line 22 which runs over a sheave 23 and is run in or out by means of a winding drum 24, both the sheave and the drum being in practice a suitable part of the drilling or pumping rig being used at the particular well.

The determination of temperature is made by inserting into the holes 16, fragments of solids having different known melting points, preferably excluding water or oil from these fragments to avoid danger of fluid contact or pressure altering the melting points, running the instrument into the hole in any convenient manner, allowing it to rest until temperatures are equalized, withdrawing the instrument and observing which of the fragments had been melted. The fragments must be so placed in the apparatus that they will observably change shape on melting, as for instance by placing a $\frac{3}{32}''$ cylinder in a $\frac{1}{8}''$ hole. On melting the material will about half fill the hole.

The melting points of these solids being known, the temperature at the depth to which the instrument is run will lie between the melting point of the highest-melting fragment which has been fused and the melting point of the next higher fragment in the scale used.

| Parts by weight | | | | Melting Point |
|---|---|---|---|---|
| Tin | Lead | Bismuth | Cadmium | |
| 4 | 8 | 15 | 3 | 140° F. |
| 4 | 8 | 15 | 4 | 158 |
| 25 | 25 | 50 | 0 | 203 |
| 2 | 3 | 5 | 0 | 231 |
| 24.6 | 23.1 | 50 | 0 | 250 |
| 24.8 | 22.1 | 53.1 | 0 | 280 |

By interpolation intermediate melting points may be obtained and it is quite possible to prepare alloys or mixtures differing by as little as 1° F. The table of mixtures above given is suggestive only and actual melting points would vary with the purity of the materials used. In practice the melting point of a quantity of alloy should be carefully checked and the fragments prepared without remelting if possible, or a considerable number of small pieces, for instance cylinders of $\frac{3}{32}''$ diameter and $\frac{1}{2}''$ long may be moulded at one time and a number of these pieces taken for melting point tests.

While we have heretofore referred to metallic alloys it is entirely feasible to replace these by single or mixed salts or organic substances, so long as there is no danger of chemical reactions taking place when the mixtures are heated. Thus for instance, for the lower range of temperatures mixtures of spermacetti (M. P. 111° F.), beeswax (143°) and carnauba wax (178°) may be taken, and for the higher naphthalene (176°) and small quantities of anthracene (421°). We therefore do not restrict ourselves to the use of metallic alloys, but only to such solid substances as have a sharp and readily determinable melting point.

This instrument is capable of use both for approximate every day determinations and for the more exact determinations required for purposes of research. Either form of the instrument shown is capable of carrying a considerable number of test fragments, the form shown in Fig. 1 up to perhaps 18, the form shown in Fig. 2 any desired number according to length. In making a first test in unknown territory, or in making approximate tests for daily use, it is desirable to space the melting points of the fragments say 10° F. apart which, assuming as true temperature the mean between the highest sample which melted and the lowest which did not melt, the maximum possible error in either direction would be 4° F., a negligible quantity for such purposes. If a more exact figure were required, further tests could be made using solids having melting points as little as 1° F. apart, which is a greater accuracy than the uniformity of the temperature to be measured justifies.

The practical functioning of either form of the instrument may be improved by placing the test fragments or cylinders in small cartridges 25 of heat conducting material having a higher melting point than that of the highest melting fragment. If these cartridges be marked in advance with the number or other identification of the test and with the melting point of the contents of each, the cartridges may be withdrawn by the operative at the end of the test and sent to the laboratory for observation, thus obviating the necessity for any specially skilled person conducting the test and enabling the instrument to be put into immediate service in another test.

We claim as our invention:

1. Apparatus for determining temperature in an earth bore-hole, comprising: a rigid metallic case adapted to be lowered to a desired depth in said bore-hole, said case having a plurality of non-communicating chambers adapted to hold fragments of solids having graduated and predetermined melting points, the fragments being of substantially smaller diameter than the respective chambers; means for excluding liquids and outside pressure from the interior of said chambers, and means for lowering said case into said hole and for withdrawing it therefrom.

2. Apparatus for determining temperature in an earth bore-hole, comprising: a metallic block adapted to be lowered to a desired depth in said bore-hole, said block having a plurality of chambers formed therein adapted to separately contain fragments of solids having graduated melting points which may be accurately determined, the fragments being of substantially smaller size than the respective chambers and of a shape which is altered by melting; means for excluding liquids and outside pressure from the interior of said chamber; and means for lowering said block into said hole and for withdrawing it therefrom.

3. Apparaturs for determining temperature in an earth bore-hole, comprising: a metallic block adapted to be lowered to a desired depth in said bore-hole, said block having a plurality of chambers formed therein; a plurality of cartridges adapted to fit within said chamber; fragments of solids having graduated melting points within said cartridges, said fragments being of substantially smaller size than the interior of their respective cartridges, said cartridges having mark of identification thereon, and means for lowering said block into said hole and for withdrawing it therefrom.

4. A heat-permeable, pressure tight and fluid tight case of exteriorly streamlined shape having in its interior a plurality of readily removable receptacles; means for closing said receptacles; angular fragments of substances of graduated melting point within the receptacles, said fragments being of substantially smaller size than their respective receptacles and means for attaching the case to a means for lowering the latter into space and withdrawing it therefrom.

In witness that we claim the foregoing we have hereunto subscribed our names this 6th day of March, 1930.

HALLAN N. MARSH.
JOHN H. HOWARD.